June 22, 1954  G. H. FISHER  2,682,051
GLIDE PATH SHAPING SYSTEM FOR BLIND LANDING EQUIPMENT
Filed Oct. 26, 1949  2 Sheets-Sheet 1

Inventor
George H. Fisher

June 22, 1954  G. H. FISHER  2,682,051
GLIDE PATH SHAPING SYSTEM FOR BLIND LANDING EQUIPMENT
Filed Oct. 26, 1949

Inventor
George H. Fisher

Patented June 22, 1954

2,682,051

UNITED STATES PATENT OFFICE 2,682,051

GLIDE PATH SHAPING SYSTEM FOR BLIND LANDING EQUIPMENT

George H. Fisher, Minneapolis, Minn., assignor to Minneapolis-Honeywell Regulator Company, Minneapolis, Minn., a corporation of Delaware Application October 26, 1949, Serial No. 123,727

4 Claims. (Cl. 343—108)

This invention relates to the field of aircraft control, and more particularly to instruments for making it possible for the pilots of aircraft to bring them down to successful landings when the weather is so overcast that visual supervision of the landing is impossible.

Instruments for performing this function are known in the art, and one of the most successful of them creates, by radio means, a particular "glide path" in space. This glide path is a straight line having a slope of from 2 to 5 degrees, normally 2½ degrees. As a practical matter the path comprises the locus of the points of intersection of equi-potential lines of the fields from two radio transmitters, and the location of the craft with respect to the glide path is determined by suitable radio receiving means.

Even at the small angle of 2½ degrees, the impact of the craft with the ground is considerable, and provision of some means for softening this impact is considered desirable. One such expedient consists in "flaring out" the beam, so that the last few feet are not an extension of the 2½ degree overall course, but are curved forward so that the actual contact with the airport is made almost tagentially. This means, however, that the touch-down point is moved further along the field in a direction cutting down the amount of space for run out of the craft. Ordinarily it is not possible to move the touch-down point further along the field in the direction from which the craft is approaching, because of obstructions outside the field.

It is a general object of the present invention to provide an improved airborne component for the instrument landing system, in which the impact with the ground of a craft following the glide path is materially reduced without reducing the glide path angle, the run out distance available, or the clearance over obstructions.

Another object of the invention is to provide a simple apparatus for modifying the conventional glide path receiver of the instrument landing system so that the advantages of easy landing which are offered by a "flared out" beam are realized by a craft which nevertheless touches down at the foot of the unflared glide path.

A broad object of the invention is to provide means supplying a pair of signals varying oppositely, in accordance with a first variable condition, from normal conditions in which they have a normal relationship, and means comparing variable portions of the signals and varying the portions as an arbitrary function of a second variable condition.

It is another object of the invention to supply a pair of voltages varying oppositely, in accordance with a first variable condition, from a normal condition in which they are equal, together with means comparing variable portions of the voltages, means varying the magnitudes of the voltages as an arbitrary function of a second condition, and means performing control functions in accordance with the relationship between the portions.

A further object of the invention is to provide means as described above, in which the operation of the means varying the portions to be compared is automatically initiated while the craft is traversing a selected portion of the glide path.

A further object of the invention is to provide means for causing a craft to depart downwardly from the glide path and then to return to it at a slower rate, so that it regains the glide path at its foot.

It is a further object of the invention to provide means as described above, in which the slope of the curved path actually followed by the craft is at first greater than that of said path, and then approaches a value of zero at a diminishing rate.

It is another object of the invention to provide means for causing a craft to depart from the glide path and then return to it, during the final portion of the glide, in accordance with signals from a Distance Measuring Equipment.

It is still another object of the invention to provide means as just described, in which the operation of the system is initiated in response to a triggering radio impulse.

Various other objects, advantages and features of novelty which characterize my invention are pointed out with particularity in the claims annexted hereto and forming a part hereof. However, for a better understanding of the invention, its advantages, and objects attained by its use, reference should be had to the subjoined drawing, which forms a further part hereof, and to the accompanying descriptive matter, in which are illustrated and described a preferred embodiment of my invention.

In the drawing:

Figure 4 shows the outline of a cam suitable to produce the glide path modification shown in Figure 3;

Figure 2:
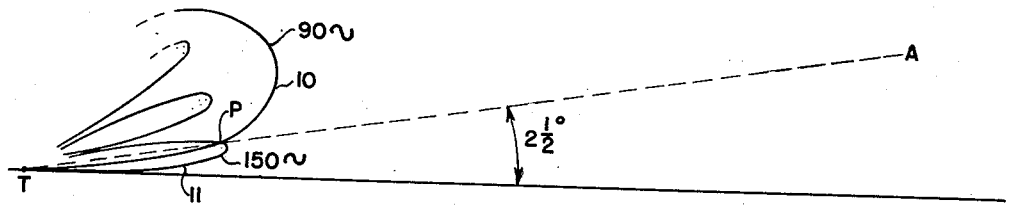
Figure 2 is a sketch showing the glide path as conventionally established by the transmitters of the instrument landing system.

Referring now to Figure 2, the conventional arrangement of the glide path of the instrument landing system will first be explained. From a transmitter located at point T, the foot of the glide path, there are radiated two signals, which have the same carrier frequency. The first signal is modulated at 90 cycles per second, and is radiated from an antenna system such that a portion of one of its equi-potential lines can be indicated by the line 10 in Figure 2. The second signal is modulated at 150 cycles, and is transmitted from an antenna which gives a multi-lobed field intensity pattern, the corresponding equi-potential line of which is shown by the line 11 in Figure 2.

The two equipotential lines 10 and 11 intersect at the point P, and it has been found that the locus of point P, as the magnitude of the potential represented by lines 11 and 10 varies, is a straight line. By suitable adjustment of the transmitting equipment, the slope of this straight line, TA, may be adjusted to any desired value, conventionally in the range from 2½ to 3 degrees with respect to the horizontal.

As is well known to those skilled in the art, the craft carries a receiver and indicator by the aid of which the position of the craft with respect to the line TA may be determined. The receiver may be of ordinary superhetrodyne construction, having suitable radio frequency, intermediate frequency, and audio frequency stages of amplification and the appropriate local oscillator and first and second detectors. The output of the second detector comprises 150 cycle and 90 cycle components whose relative intensity depends on the position of the craft with respect to the line TA. By impressing this output on filters tuned to 90 cycles and 150 cycles respectively, and thence through separate rectifiers, there can be obtained unidirectional voltages proportional to the 90 and 150 cycle components of the signal received by the craft: by comparing these voltages an indication of departure of the craft from the line TA can be obtained. The two voltages are equal when the craft is on the line, and become unequal in opposite senses as the craft departs from the line in one direction or the other. If a craft is located above the line TA, for example, it is in an area where the intensity of the signal modulated at 90 cycles is greater than that of the signal modulated at 150 cycles, and the rectified 90 cycle voltage exceeds the rectified 150 cycle voltage.

The structure so far described is given in much more detail in publication AN–16–30 ARN5–3, "A Handbook of Maintenance Instruction, Radio Receiving Equipments AN/ARN–5 and AN/ARN–5A," published September 25, 1945, and declassified February 18, 1947. This structure is also disclosed in the copending application Ser. No. 49,442 of Alderson et al., filed September 15, 1948, and assigned to the assignee of the present application, which copending application further discloses and claims one embodiment of means for making use of the indicator voltage to control the operation of a craft through a suitable coupling unit and automatic pilot.

An automatic pilot is an arrangement of gyroscopes, servomotors and associated apparatus which functions to operate the control surfaces of the craft so as to stabilize its attitude about roll, pitch and yaw axes, and ordinarily includes means whereby the yaw attitude or heading of the craft may be changed as occasion requires. Many automatic pilots of varying degrees of complexity are known in the art, and may be pneumatic, hydraulic, or electrical: the electric automatic pilots are also of several types.

In order to control the operation of the automatic pilot about the yaw axis of the craft in accordance with departure of the craft from the glide path, the minute electrical signal which appears at the indicator must be converted to a signal of useable character as applied to the automatic pilot. This may involve amplification, conversion from D. C. to A. C., or conversion from electrical energy to mechanical energy, depending on the automatic pilot selected. In the present application an electrical automatic pilot requiring an alternating signal voltage is assumed.

Figure 3:
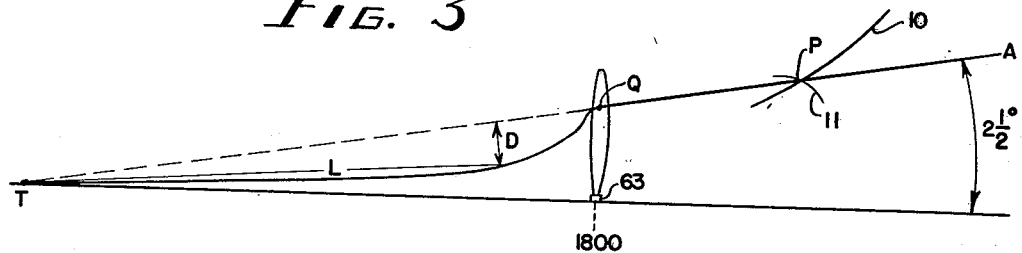
Figure 3 is a sketch showing the modification of the glide path brought about in the practice of the invention.

The foregoing condensed review of the prior art structure has been presented in order that the construction and operation of the improvement comprising the subject matter of the present application may be more readily understood. Referring now to Figure 3, the glide path TA is shown as in Figure 2, on a somewhat larger scale. The portion AQ of this line is rectilinear as in Figure 2, and is shown solid. The point Q represents a position of the craft on the line TA at which it has cleared all obstructions and is ready to land on the field. The solid curved line QT shows a landing path which is considered more desirable than the straight dotted line QT, because of the fact that it gives a more nearly tangential contact between the craft and the ground at the point of touch-down. It will be seen that at the point Q this curved path departs from the rectilinear path, the slope of the curve being greatest near Q and decreasing to almost zero at the point T. It has been observed that craft being flown manually in conditions of good visibility perform a landing pattern which is essentially that of the curve QT, and the structure of the invention is provided to make possible control of the craft to follow this curved path under instrument landing conditions.

The nature of the curve QT is such that, except in a transient period at point Q, the distance D from the straight line TQ at any point therealong is an arbitrary function of the distance L from the point T, being zero when this distance is zero and also when the distance is equal to that between T and Q, and being greatest at a point considerably less than half way from Q to T. The arbitrary value for D, expressed by the equation $D=f(L)$ is easily obtained by providing a cam whose rotation is proportional to L, and whose rise or fall is proportional to D, determined according to the above equation.

Figure 1:
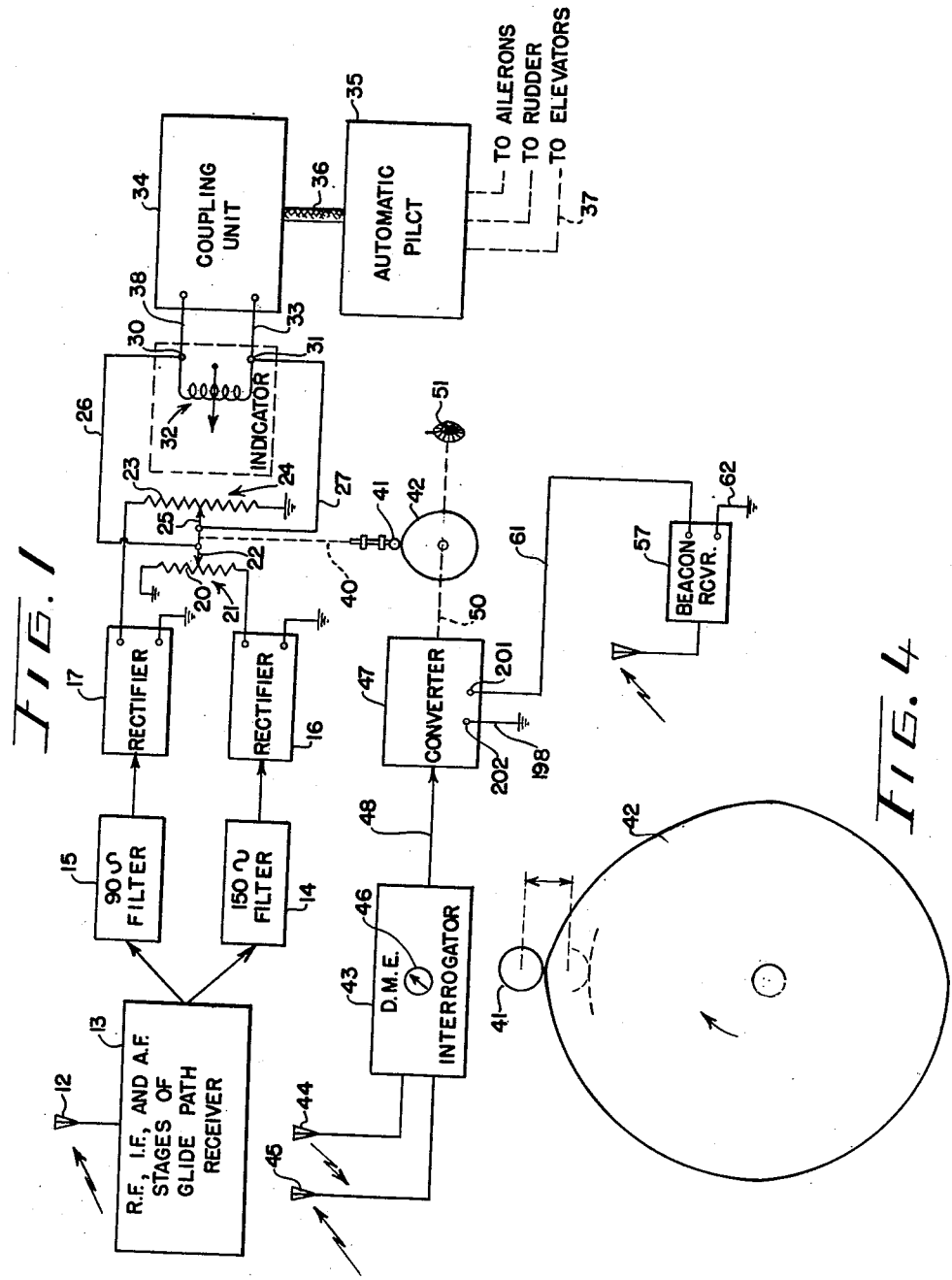
Figure 1 is a schematic showing of the airborne components of an instrument landing system modified in accordance with the principles of the invention.

Structure for causing a craft to follow the curved path QT is shown in Figure 1. In this figure the glide path signal is received on the antenna 12, and passes through the radio frequency, intermediate frequency, and audio frequency amplification stages of the glide path receiver, indicated at 13. The output of unit 13 is applied to a 150 cycle pass filter 14 and a 90 cycle pass filter 15, and the filter outputs are impressed separately on rectifiers 16 and 17.

The output from rectifier 16 is impressed across the winding 20 of voltage divider 21 having a sliding contact 22, and the output of rectifier 17 is impressed across the winding 23 of a voltage divider 24 having a slider 25.

Sliders 22 and 25 are connected by conductors 26 and 27 respectively to the input terminals 30 and 31 of the glide path movement 32 of the cross pointer indicator of the instrument landing system, and also, by conductors 38 and 33, to a coupling unit 34 which energizes an automatic pilot 35 through a suitable cable 36. Automatic pilot 35 controls the operation of the elevators of the craft through a connecting link 37, and coupling unit 34 functions to supply signals, suitable for causing operation of the automatic pilot, which vary in accordance with the output appearing on conductors 26 and 27.

Sliders 22 and 25 are moved with respect to their windings by a mechanical connection 40 to a follower 41, spring pressed into continuous engagement with a cam 42. Cam 42 is positioned in accordance with the distance L, which in the present application is shown as being determined by a conventional Distance Measuring Equipment of which the interrogator is shown at 43. The term "Distance Measuring Equipment" refers to specific radio apparatus known in the art by that name, and described in the report of the "Third Commonwealth and Empire Conference on Radio for Civil Aviation, 1945," pages 197 to 205. As is well known, the Distance Measuring Equipment is a system in which a signal pulse is transmitted from interrogator 43 by an air-borne antenna 44, received at a ground station known as a responder, and retransmitted so that it is received at a second air-borne antenna 45 and returned to interrogator 43. The time interval between the transmitted and received pulses is determined in suitable electronic apparatus, in terms of a voltage indicated by a suitable meter 46 in the interrogator.

Figure 5:
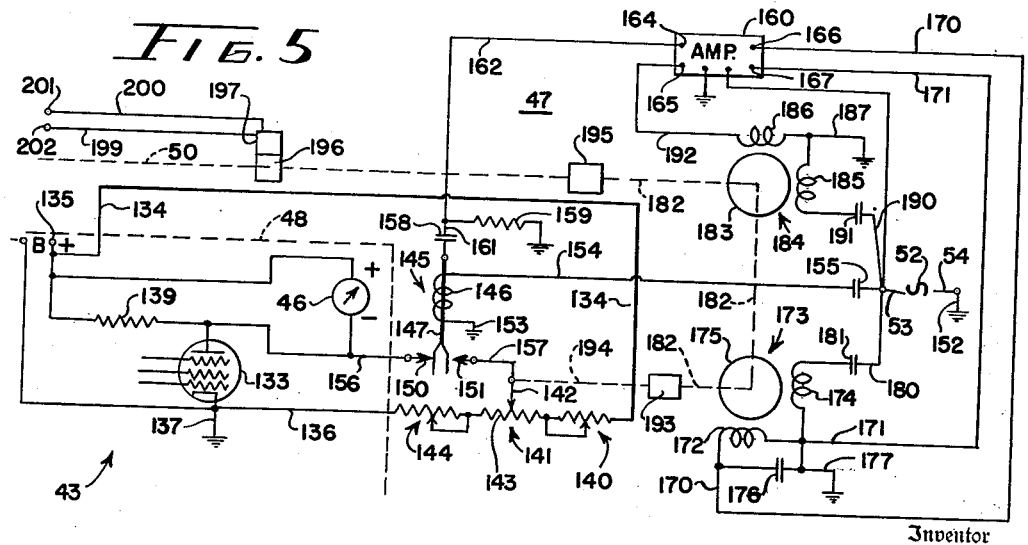
Figure 5 is a schematic showing of a component of Figure 1.

It is required in the present application to provide mechanical motion for connection 40, rather than a visual output as is supplied at meter 46. For this purpose a converter 47 is connected to interrogator 43 by a suitable connection 48, and this converter functions to provide rotation of an output shaft 50 carrying cam 42, through an angle proportional to the distance of interrogator 43 from the responder located at point T. The construction of a suitable converter is shown in Figure 5, and is also disclosed and claimed in the copending application Ser. No. 33,608 of O. H. Schuck, filed June 17, 1948, and assigned to the assignee of the present application.

The normal position of sliders 22 and 25 is that in which, when the output voltages of rectifiers 16 and 17 are equal, no potential difference appears between conductors 26 and 27. From this position the sliders are displaced with displacement of cam follower 41 in accordance with rise and fall of cam 42. The total amount of displacement of the sliders, and hence the maximum change in cam 42, is chosen to give a selected output voltage to indicator 32, the voltage being of such magnitude and sense that displacement of the craft from the straight line TQ in Figure 3 by a desired amount D renders unequal the 150 and 90 cycle component impressed on filters 14 and 15 by such an amount as results in zero voltage in conductors 26 and 27, and hence in return of indicator 32 to its central zero position. It is of course obvious that while movement of the sliders is unitary in the same direction, their electrical effects are opposite, acting in the one case to increase the proportion of one rectifier output and in the other case to decrease the proportion of the other rectifier output.

It is desired that the craft be located exactly on the line TA at the point Q and again at the point T: for these two points the sliders must be in their normal position. At all other points a voltage must appear between conductors 26 and 27 of the same polarity as would appear if the craft were actually higher than the line TA in normal descent along the path. In other words, a variably greater proportion of the voltage across winding 23, and a variably smaller proportion of the voltage across winding 20 must be impressed between conductors 26 and 27 to give the desired operation of indicator 32. This may be accomplished by cutting cam 42 according to the outline shown in Figure 4.

Assume that the straight line distance from T to a craft located at point Q is 1800 feet: then if one revolution of cam 42 is caused by converter 47 when the craft is moving from the point Q to the point T, these two points may be represented by a single position of the cam follower 41, and the cycle of operation of this apparatus is a closed one. Each five degree rotation of cam 42 therefore corresponds to a difference of twenty-five feet in the distance of the craft from the point T. If now arcs decreasing in radius in steps of twenty-five feet, and centered about the point T, are drawn intersecting the curved line TQ, and the perpendicular distance of each of these points of intersection from the straight line TQ are measured, the radius of the cam at each 5 degree interval thereon may readily be determined. This is accomplished by setting up a simple proportion between the maximum value of displacement D so found and the maximum travel of cam follower 41 desired to give the requisite output voltage.

A cam cut according to the principles just outlined gives the greatest possible sensitivity of control of the craft, but sliders 22 and 25 must not be displaced from their normal position except in the last 1800 feet of the approach to the landing. Means must therefore be provided for setting sliders 22 and 25 in their normal position, and for preventing operation of converter 47 from changing the position of cam 42, until the last 1800 feet of the glide are entered upon. The manual setting is accomplished by a knob 51, and the disabling function is accomplished by means included in converter 47.

*Construction of converter 47*

Converter 47 is shown in Figure 5 with the related portions of interrogator 43. The output of the latter is conventionally a voltage applied to a high resistance voltmeter: the purpose of the converter is to derive from this voltage a shaft rotation proportional thereto, without destroying the accuracy of the original system. In Figure 5, the interrogator is shown at 43, below and to the left of the dotted line 48; and the voltage in question is impressed on meter 46, one side of which is connected to the plate of a pentode 133, and the other side of which is connected to the positive terminal 135 of a source of plate voltage, the meter thus being connected across a resistor 139 in the plate circuit of pentode 133. The resistance of the pentode is varied by voltages impressed on its control electrodes, by means not shown, in accordance with the distance being measured, and thus the voltage drop across resistor 139 between the plate and the positive terminal 135 of the power supply is also varied.

The most satisfactory method of motor control is one using a rebalancing or null type of network: such a network must be so designed that the measuring circuit is not loaded down thereby to a point where its accuracy is destroyed. This is accomplished according to the present invention by a comparison arrangement in which first the voltage across the meter and then a comparison voltage is applied to an amplifier of high input resistance, and the amplifier energizes a motor to adjust the comparison voltage to equality with the voltage being measured. The motor shaft rotation also comprises the mechanical output from the converter, since it is a measure of the comparison voltage, which is in turn proportional to the distance being measured.

In order to minimize the effect of change in the supply voltage, the comparison voltage is obtained from the same source. Thus a first conductor 134 is connected to the positive terminal 135 of the power supply and a second conductor 136 is connected to ground, to which is connected the negative terminal of the power supply, at 137. In series between these two conductors there are connected a first variable resistor 140, a potential divider 141 having a slider 142 movable with respect to a linear winding 143, and a second variable resistor 144. The values of resistors 140 and 144 are adjusted so that when meter 46 gives its maximum reading, slider 142 is at the same potential as the negative terminal of the meter if the slider is at the left hand end of winding 143, and when meter 46 gives its minimum reading slider 142 is at the same potential as the meter terminal if at the right hand end of the winding: resistors 140 and 144 are thus centering means coordinating the range of slider 142 with the range of voltage available across pentode 133.

The converter includes a vibrator 145 having a winding 146, a movable contact 147, and a pair of fixed contacts 150 and 151. Winding 146 is energized from a source 52 of alternating voltage through conductor 54, ground connections 152 and 153, a conductor 154, a phasing capacitor 155, and conductor 53, to cause movable contact 147 to oscillate between fixed contacts 150 and 151 at the frequency of the source. Fixed contact 150 is connected to the negative terminal of meter 46 by a conductor 156, and fixed contact 151 is connected to silder 142 by conductor 157. The potential of movable contact 147 is thus alternated between that of fixed contact 150 and that of fixed contact 151, and if the two fixed contacts are not at the same potential a square-wave alternating voltage of the frequency of source 52 appears upon movable contact 147, and is applied to an amplifier 160 through a blocking capacitor 158, conductors 161 and 162, and ground. Operation of movable contact 147 is maintained in phase with the voltage supplied by conductors 53 and 54 by means of phasing capacitor 155. A grounded resistor 159 cooperates with blocking capacitor 158 to separate the A. C. and D. C. input circuits to the amplifier.

Amplifier 160 is of the type in which a voltage is obtained at output terminals 166 and 167 which is of the same phase, positive or negative, and the same frequency, as the voltage applied to input terminals 164 and 165. The output voltage is impressed by conductors 170 and 171 upon one winding 172 of a two phase motor 173 having a second winding 174 and a rotor 175. The power factor of the motor may be improved by the addition of a capacitor 176 across winding 172. Winding 174 is energized from source 52 through conductor 54 and ground connections 152 and 177, and through conductors 180 and 53 and quadrature capacitor 181.

Unitary on the shaft 182 of motor 173 is the rotor 183 of a velocity generator or dynamic transformer 184. This generator has an energizing winding 185 and an output winding 186, the former being energized from source 52 through conductor 54 and ground connections 152 and 187, and through conductors 53 and 190 and quadrature capacitor 191. Winding 186 is connected in the input circuit of amplifier 160, which may be traced from terminal 164 through conductors 162 and 161, capacitor 158, movable contact 147, fixed contact 150 (or 151), pentode 133 (or slider 142, the portion of winding 143 to the left of the slider, variable resistor 144, and conductor 136), ground connections 137 and 187, winding 186, and conductor 192 to input terminal 165.

The shaft 182 of motor 175 is connected through reduction gearing 193 to a shaft 194 which actuates slider 142 along winding 143. Shaft 50 carrying cam 42 is also coupled to motor shaft 182, through reduction gearing 195 and a clutch 196.

*Operation of converter 47*

The mode of operation of the converter described above will now be readily understood. For illustration suppose first that a craft is fixed at a point 80 miles from a particular transmitter. In normal operation of the DME, the voltage across meter 46 varies substantially linearly with distance from the station, so that for example the voltage may be 125 volts when the craft is 100 miles from the station and 26 volts when the craft is 1 mile from the station. The voltage between terminal 135 and ground is fixed at say 275 volts, so that the voltage between ground and the plate of the pentode, and hence between ground and fixed contact 150, may vary from 249 volts, when the craft is one mile from the station, to 150 volts, when the craft is 100 miles from the station. Under these conditions the voltage with respect to ground on fixed contact 150, when the craft is 80 miles from the station, is 230 volts. The converter is adjusted so that the resistances of resistor 140, winding 143 and resistor 144 are in the ratio of 25, 100 and 150 respectively: the potentials at the terminals of winding 143, connected to resistors 140 and resistor 144 respectively, are 250 and 150 volts respectively measured to ground.

Slider 142 has by the prior operation of the system been set at some position along winding 143: if this position happens to be at four-fifths of the length of the winding from the junction point with resistor 144, the slider is at a potential of 150+(⅘) (100) volts, or 230 volts, with respect to ground, and fixed contact 151 is at this potential. Fixed contact 150 is also at this potential by reason of operation of the interrogator, and movable contact 147, in moving from fixed contact 150 to fixed contact 151, encounters no change in potential, but remains at a uniform voltage with respect to ground. The movable contact is so adjusted as not to disengage both fixed contacts at the same time, always engaging one contact just before disengaging the other. The fixed voltage between movable contact 147 and ground is prevented from reaching amplifier 160 by blocking capacitor 158: the amplifier is hence deenergized and no operation of motor 173 takes place. Slider 142 remains where it is, shaft 50 does not rotate, and cam 42 remains in its present position.

If the position of slider 142 is not four-fifths of the length of the winding from the junction point with resistor 144, the slider is at some other potential than 230 volts with respect to ground. If the slider is too near the junction point with resistor 140, fixed contact 151 is at a potential higher than fixed contact 150, and movable contact 147 alternates between a potential to ground of 230 volts and one of say 240 volts. This in effect applies a square wave voltage of 5 volts amplitude to the input of amplifier 160 through capacitor 158, which as before blocks out the continuous 235 volt component of the square wave. The frequency of the square wave is that of source 52, since the vibrator is energized from that source and operates synchronously with it.

The fundamental component of the square wave is amplified and impressed by amplifier 160 on winding 172 of motor 173. By reason of phasing capacitor 155 the movement of vibrator 145 has been brought into such a phase relation with the voltage of the source that under the foregoing conditions the voltage across winding 172 is exactly in phase for example with the voltage of the source. The voltage across winding 174, on the other hand, lags that of the source by 90°, by reason of quadrature capacitor 181. Motor 173 is constructed, as is well known in the art, so that when windings 172 and 174 are energized with alternating voltages in quadrature, a rotating field is set up and the motor operates, the direction of operation being determined by which of the voltages leads the other. The connections of winding 174 to capacitor 181 and ground 177 are so made that motor 173 operates in the direction to drive slider 142 to the left as seen in Figure 5, thus reducing the voltage on fixed contact 151 until it has the same value as that on contact 150, the A. C. input to amplifier 160 from movable contact 147 decreasing at the same time.

When motor 173 begins to operate, velocity generator 184 begins to supply an output voltage. This generator is of the type which supplies an output increasing in amplitude but not in frequency as the speed at which it is driven increases. The arrangement is basically a transformer of which winding 185 comprises the primary and winding 186 the secondary, the transfer of energy between the windings being substantially zero for no rotation of the rotor and increasing as the speed of the rotor increases. The voltage output from secondary winding 186 is brought into substantially 180° phase relation to the voltage at source 25 by phasing capacitor 191, and is connected into the input circuit of amplifier 160 in such a fashion as to oppose the voltage from movable contact 147. So long as a signal of appropriate size reaches the motor from amplifier 160, the velocity generator signal is of negligible effect, but when the signal from vibrator 145 is reduced almost to zero any tendency of the motor to overshoot results in a signal from the velocity generator which is greater than the principal signal. This increases the energization of the motor winding and quickly brings the motor to a halt, thus giving the apparatus antihunt properties.

If slider 142 happens to be too near the junction point of winding 143 and receiver 144, instead of too near the junction point of winding 143 and resistor 140, fixed contact 151 is at a potential lower than fixed contact 150, and movable contact 147 alternates between a potential to ground of 230 volts and one of say 220 volts. The movable contact engages the respective fixed contacts at the same points in the cycle of source 52 as before, but now the relative polarities of the contacts is reversed and the square wave transmitted to amplifier 160 through capacitor 158 is of the opposite phase to that previously described. The phase of the output of amplifier 160 accordingly reverses, reversing the phase of the voltage across winding 172 of motor 173. The phase of winding 174 remaining constant, this results in reversal of the operation of motor 173, moving slider 142 to the right as seen in Figure 2 to reduce the voltage difference between fixed contacts 150 and 151 to zero, and also reversing the direction of operation of shaft 182 and the phase of the output of velocity generator 184, so that it can again cooperate in opposition with the signal voltage to give antihunt operation to the system.

Heretofore it has been assumed that the craft is at a point fixed in space. Actually of course this is not true; the craft is moving along the curved line QT. The airspeed of the craft is maintained constant by the human pilot, and hence for a constant wind the distance from the transmitter to a craft approaching a transmitter decreases at a uniform rate. This means that the voltage on fixed contact 150 also decreases at a constant rate, and thus for the equilibrium condition in the amplifier input-output system the motor must run at such a constant rate as will give a constant input signal to the amplifier to energize the motor. The amount of rotation of shaft 50 is thus a measure at any time of the actual distance of the craft from the transmitter, the slight "droop" in the system required to continuously energize motor 153 being negligible. Converter 47 thus supplies a mechanical output at shaft 50 proportional to the distance from the craft to the responder.

The engaging system

It is desirable that the distance measuring equipment be available for use throughout the entire flight, and converter 47 should be energized for at least a sufficiently long interval to allow slider 142 to be brought to the proper position on winding 143, before operation of cam 42 by motor 175 is initiated. To make this possible there is included in converter 47 the electromagnetic clutch 196 which is effective when energized to connect shaft 50 for operation by motor 175, but which in its normal deenergized condition frees shaft 50 from motor 175, so that the shaft and cam 42 may be positioned by operation of manual knob 51. Clutch 196 is energized from the output of a beacon receiver 57, as shown in Figuers 1 and 5: the circuit includes ground connections 62 and 198, terminal 202 of converter 47, conductor 199, conductor 200, terminal 201, conductor 61, and receiver 57. Clutch 196 is shown as associated with a locking device 197 for maintaining the clutch engaged after the signal from receiver 57 is gone.

Beacon receiver 57 is of the type conventionally used in instrument landing systems. Whenever an aircraft carrying this receiver passes through the limited field of a beacon transmitter, a relay in the receiver is actuated to operate a pilot light, indicating to the pilot that he has reached a desired location. The same relay in the beacon receiver can also energize locking device 197, connecting cam 42 to motor 175 and initiating operation of cam follower 41.

In Figure 3 the transmitter to which beacon receiver 57 responds is shown at 63, directly under the point Q. Transmitter 63 corresponds to the boundary marker beacon of the instrument landing system if the installation at a particular airport includes this beacon; if desired a separate beacon for this purpose can also be installed.

It should also be appreciated that it is not necessary to initiate operation of cam 42 by a marker beacon responsive device. Obvious alternatives occurring to one skilled in the art would include a manual switch whereby the human pilot could personally initiate this operation when by visual inspection of meter 46 it was evident that the craft had reached the desired distance from the transmitter.

*System operation*

The operation of this system as a whole should now be quite obvious. The craft proceeds down the glide path from A to Q in the conventional fashion. When the point Q has been reached clutch 196 is energized, preferably in accordance with the signal from beacon receiver 57, and operation of motor 173 thereafter causes rotation of cam 42, with consequent displacement of sliders 22 and 25 from their normal position. This displacement of the sliders results in the appearance at indicator 32, when the craft is on the landing beam, of a voltage having such a polarity as to cause the indicator to indicate that the craft is too high, and to cause the coupling unit to move the elevators of the craft so that it moves downwardly. This downward movement changes the magnitudes of the voltages on windings 20 and 23 supplied by rectifiers 16 and 17, so that when the unequal portions of these now unequal voltages taken by the sliders are impressed on the indicator, it returns to a zero position and the operation of the coupling unit ceases except insofar as it is required to keep the craft on the new curved path. By the time the craft has traveled the 1800 feet between point Q and T, cam 42 has returned to its initial position, sliders 22 and 25 are again in their normal positions, the craft is on the original straight line glide path, and has just touched the ground.

In the foregoing description structure has been disclosed which brings the craft into contact with the ground at the same point as does the normal glide path. This is not a necessary limitation of the apparatus: cam 42 can be cut so as to cause touch-down to occur sooner or later than is the normal case, if either is desired.

The apparatus is also useful in aircraft not equipped with the automatic pilot and coupling unit, since the human pilot can control the craft in accordance with the indication of indicator 32 just as he normally does, and thus cause the craft to follow the modified beam rather than the conventional beam.

It will be apparent from a review of the foregoing specification that I have provided an improved blind landing apparatus in which the impact of a craft following the glide path is reduced, by causing the craft to depart from the straight line path and to contact the surface of the airport at a much flatter angle, without requiring that the run out distance be cut down. The apparatus may be used either as an indicator for the assistance of a human pilot, or as an automatic means for controlling the craft. It will also be apparent that my invention is applicable universally, regardless of the exact angle of the glide path, or of the exact distance between the points T and Q, since a suitable cam can be cut for any such condition.

Numerous objects and advantages of my invention have been set forth in the foregoing description, together with details of the structure and function of the invention, and the novel features thereof are pointed out in the appended claims. The disclosure however is illustrative only, and I may make changes in detail within the principle of the invention, to the full extent indicated by the broad general meaning of the terms in which the appended claims are expressed.

I claim as my invention:

1. In a device of the class described, in combination: means supplying a pair of voltages which vary in accordance with the displacement of a craft from a selected path, and which are equal when said craft is on said path; a pair of voltage dividers, having a common terminal, energized with said voltages; indicating means actuated in accordance with the potential difference between the movable taps of said voltage dividers; means normally so positioning said sliders that when said voltages are equal said potential difference is zero so that said indicating means indicates that the craft is moving along the selected path; a first shaft; means rotating said first shaft in accordance with the distance of the craft from a selected point; a second shaft; means carried by said second shaft for causing said sliders to be displaced unitarily from said normal position, and radio responsive means energizable to mechanically connect said first and second shafts.

2. In a device of the class described, in combination; means supplying a pair of voltages of opposite sense which vary oppositely in accordance with the displacement of a craft from a selected path, and which are equal when said craft is on said path; a voltage responsive device; connecting means normally energizing said device with said voltages in equal measure, so that when said voltages are equal, the response of said device is zero; a pair of simultaneously adjustable attenuating means included in said connecting means for reducing the effect of one of said voltages, and simultaneously increasing the effect of the other of said voltages on said voltage responsive means; and means adjusting said attenuating means in accordance with the distance from the craft to a desired point.

3. In apparatus of the class described, in combination; an instrument landing receiver including a pair of output devices giving independent outputs in accordance with the higher and lower frequency components of a glide path beam; adjustable means connected to said output devices for fractionating said outputs into oppositely variable, normally equal portions; signal responsive means connected to said adjustable means for actuation in accordance with the relation between said portions; motor means connected to adjust said adjustable means simultaneously in a closed cycle of operation; and means connected to said motor means for causing operation thereof when said receiver is displaced from the foot of said beam by the distance through which a craft carrying said receiver moves during said cycle of operation.

4. In apparatus of the class described, in combination: a control apparatus including a pair of output devices giving separate outputs in accordance with dependent characteristics of a first variable condition; adjustable means connected to said output devices for fractionating said outputs into oppositely variable, normally equal portions; signal responsive means connected to said adjustable means for actuation in accordance with the relation between said portions; motor means connected to simultaneously adjust said adjustable means in a closed cycle of operation; and second condition responsive means connected to said motor means for causing operation thereof when said second condition assumes a selected value.

References Cited in the file of this patent

UNITED STATES PATENTS

| Number | Name | Date |
| --- | --- | --- |
| Re. 22,484 | Cooke et al. | May 23, 1944 |
| 1,999,047 | Hahnemann | Apr. 23, 1935 |
| 2,051,966 | Runge | Aug. 25, 1935 |
| 2,134,132 | Koster | Oct. 25, 1938 |
| 2,196,674 | Hahnemann | Apr. 9, 1940 |
| 2,264,056 | Thacker | Nov. 25, 1941 |
| 2,395,854 | Ferrill | Mar. 5, 1946 |
| 2,439,044 | Ferrill | Apr. 6, 1948 |
| 2,599,223 | Blitz | June 3, 1952 |